United States Patent
Heinonen

(10) Patent No.: US 11,754,710 B2
(45) Date of Patent: Sep. 12, 2023

(54) MEASUREMENT DEVICE AND METHOD OF OPERATING THEREFOR

(71) Applicant: AI4 International Oy, Helsinki (FI)

(72) Inventor: Tero Heinonen, San Francisco, CA (US)

(73) Assignee: Ai4 International Oy, Helsinki (FI)

(*) Notice: Subject to any disclaimer, the term of this patent is extended or adjusted under 35 U.S.C. 154(b) by 818 days.

(21) Appl. No.: 16/656,910

(22) Filed: Oct. 18, 2019

(65) Prior Publication Data

US 2021/0116562 A1 Apr. 22, 2021

(51) Int. Cl.
| | |
|---|---|
| *G01S 7/4865* | (2020.01) |
| *G01S 7/4915* | (2020.01) |
| *G01S 17/08* | (2006.01) |
| *G01S 17/931* | (2020.01) |
| *G01S 7/499* | (2006.01) |

(52) U.S. Cl.
CPC ............ *G01S 17/08* (2013.01); *G01S 7/4865* (2013.01); *G01S 7/4915* (2013.01); *G01S 17/931* (2020.01); *G01S 7/499* (2013.01)

(58) Field of Classification Search
CPC ...... G01S 17/003; G01S 17/08; G01S 17/931; G01S 7/4865; G01S 7/4915; G01S 7/499
USPC ........................................................ 356/4.01
See application file for complete search history.

(56) References Cited

U.S. PATENT DOCUMENTS

| | | | |
|---|---|---|---|
| 4,973,968 A | 11/1990 | Hurd | |
| 9,268,013 B2 | 2/2016 | Rieger et al. | |
| 2017/0082737 A1* | 3/2017 | Slobodyanyuk | G01S 7/497 |
| 2017/0307736 A1* | 10/2017 | Donovan | G01S 7/484 |
| 2018/0164408 A1* | 6/2018 | Hall | A61K 31/714 |
| 2018/0284228 A1* | 10/2018 | LaChapelle | G01S 17/42 |
| 2018/0284274 A1* | 10/2018 | LaChapelle | G01S 7/483 |
| 2019/0293796 A1* | 9/2019 | Hall | G01S 7/51 |
| 2020/0025923 A1* | 1/2020 | Eichenholz | G01S 17/10 |
| 2020/0034644 A1* | 1/2020 | Paesen | G01S 17/894 |
| 2020/0150229 A1* | 5/2020 | Magnani | G01S 7/4876 |
| 2020/0264285 A1* | 8/2020 | Ding | G01S 17/89 |

* cited by examiner

*Primary Examiner* — Kathleen M Walsh
(74) *Attorney, Agent, or Firm* — Ziegler IP Law Group LLC

(57) ABSTRACT

A method of operating a measurement device. The method includes performing a first measurement, by emitting a first beam of light having a first wavelength, at a first instant of time. The method further introducing a first passive period of time after the first measurement, wherein, during the first passive period of time, no beam of light is emitted. The method further includes performing a second measurement, by emitting a second beam of light having a second wavelength, at a second instant of time, wherein the second wavelength is different than the first wavelength the second instant of time is after the first passive period of time. The method further includes introducing a second passive period of time after the second instant of time, wherein, during the second passive period of time, no beam of light is emitted and the second passive period of time is different from the first passive period of time.

19 Claims, 3 Drawing Sheets

MEASUREMENT DEVICE AND METHOD OF OPERATING THEREFOR

TECHNICAL FIELD

The present disclosure relates generally to a measurement device for remote detection and measurement of a distance of an object and a method of operating the measurement device; and more specifically, to a Light Detection and Ranging (LiDAR) device and method of operating the LiDAR device that provides for reduced interference among similar LiDAR devices in the proximity of each other.

BACKGROUND

Autonomous cars need to detect their environments for other cars, pedestrians, animals, road lanes, road surface condition, traffic control devices and other road users. Autonomous cars make their real-time driving decision based on what they can perceive from the environment. A failure to perceive the surroundings may cause an immediate accident and hence the reliability of sensing and perception must be as high as possible. These autonomous cars, generally, position themselves and detect surroundings using a variety of sensor technologies. For example, LiDAR (Light Detection and Ranging) systems are most commonly used sensors which uses laser technology to make precise distance measurements over short or long distances.

LiDAR devices have the potential to be utilized extensively in applications like autonomous vehicle navigation, mobile mapping and the like. However, problems remain in developing effective LiDAR devices that can address the interference challenges and operate reliably in an environment where hundreds or thousands of like devices are operating simultaneously. With the expected increase in number of autonomous vehicles over the coming years, the occurrences where multiple LiDAR units are operating simultaneously in close vicinity to each other will increase. Such operation of multiple LiDAR units in close proximity to each other may create a potential for each unit to become a source of jamming and/or of an interfering signal for another LiDAR unit. Such interference substantially affects the functioning and the real-time driving decision making in the autonomous vehicles.

One possible solution to reduce interference between individual LiDAR systems could be to utilize time division synchronization between the LiDAR units, such that the transmit times of one unit do not overlap with the transmit times of other systems in the proximity. However, this technique of synchronization of individual LiDAR units lowers the capture rate for each LiDAR unit, and is impractical when the individual LiDAR units are integrated with separate, independently-controlled systems.

Therefore, in light of the foregoing discussion, there exists a need to overcome the aforementioned drawbacks associated with interference between multiple LiDAR systems, and similar sensing systems.

SUMMARY

The present disclosure seeks to provide a measurement device that provides for reduced interference among different measurement devices in the vicinity of each other. The present disclosure also seeks to provide a method of operating a measurement device that provides for reduced interference among different measurement devices in the vicinity of each other. The present disclosure seeks to provide a solution to the existing problems associated with developing effective measurement devices that can address the interference challenges and operate reliably in an environment where hundreds or thousands of like devices are operating simultaneously. An aim of the present disclosure is to provide a solution that overcomes at least partially the problems encountered in prior art by providing a sequence of emission of beam of light such as laser beams from the measurement device and further configuring the measurement device to only utilize beam of lights such as laser beams corresponding to the sequence for sensing purposes.

In one aspect, an embodiment of the present disclosure provides a method of operating a measurement device, the method comprising:

performing a first measurement, by emitting a first beam of light having a first wavelength, at a first instant of time;

introducing a first passive period of time after the first measurement;

performing a second measurement, by emitting a second beam of light having a second wavelength, at a second instant of time, wherein the second wavelength is different than the first wavelength and the second instant of time is after the first passive period of time; and introducing a second passive period of time after the second instant of time, wherein the second passive period of time is different from the first passive period of time.

In another aspect, an embodiment of the present disclosure provides a measurement device comprising:

at least one emitter configured to generate beam of lights;

at least one receiver configured to detect the beam of lights for sensing purposes; and a controller operatively coupled to the at least one emitter and the at least one receiver and is configured to:

perform a first measurement, by emitting a first beam of light having a first wavelength, at a first instant of time;

introduce a first passive period of time after the first measurement;

perform a second measurement, by emitting a second beam of light of a second wavelength, at a second instant of time, wherein the second wavelength is different than the first wavelength and the second instant of time is after the first passive period of time; and introduce a second passive period of time after the second instant of time, wherein the second passive period of time is different from the first passive period of time.

Embodiments of the present disclosure substantially eliminate or at least partially address the aforementioned problems in the prior art, and provides a measurement device and method of operating therefor capable of substantially eliminating the interference among multiple measurement devices operating simultaneously in the vicinity of each other, for example, multiple Light Detection and Ranging (LiDAR) devices being used in autonomous driving.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
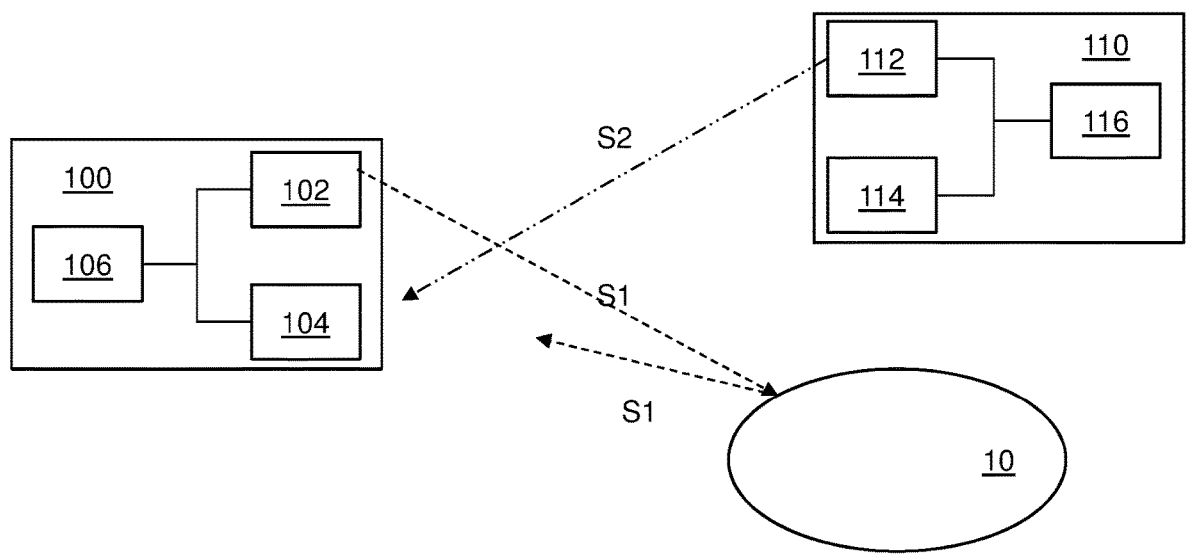
FIG. 1 is a schematic illustration of situation with two measurement devices, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a method of operating a measurement device, the method comprising:

performing a first measurement, by emitting a first beam of light having a first wavelength, at a first instant of time;

introducing a first passive period of time after the first measurement;

performing a second measurement, by emitting a second beam of light having a second wavelength, at a second instant of time, wherein the second wavelength is different than the first wavelength and the second instant of time is after the first passive period of time; and introducing a second passive period of time after the second instant of time, wherein the second passive period of time is different from the first passive period of time.

In another aspect, an embodiment of the present disclosure provides a measurement device comprising:

at least one emitter configured to generate beam of lights;

at least one receiver configured to detect the beam of lights for sensing purposes; and a controller operatively coupled to the at least one emitter and the at least one receiver and is configured to:

perform a first measurement, by emitting a first beam of light having a first wavelength, at a first instant of time;

introduce a first passive period of time after the first measurement;

perform a second measurement, by emitting a second beam of light of a second wavelength, at a second instant of time, wherein the second wavelength is different than the first wavelength and the second instant of time is after the first passive period of time; and introduce a second passive period of time after the second instant of time, wherein the second passive period of time is different from the first passive period of time.

The present disclosure seeks to provide a measurement device and a method for operating the measurement device. In particular, the present disclosure seeks to provide a Light Detection and Ranging (LiDAR) device and a method for operating the LiDAR device. Hereinafter, the terms "measurement device" and "LiDAR device" have been interchangeably used without any limitations. The LiDAR device of the present disclosure provides for reduced interference among similar devices in the vicinity thereof. The present LiDAR devices have the potential to be utilized extensively in applications like autonomous vehicle navigation, mobile mapping and the like. For example, in autonomous vehicle navigation, with reduced interference, the functioning and the real-time driving decision making of the autonomous vehicles is improved significantly. This helps to reduce the number of accidents and may potentially save many lives.

The LiDAR device comprises at least one emitter configured to generate beam of light. An example of a beam of light is a laser beam. An other example of a beam of light is a light generated with light emitting diodes (LED)'s. In general a beam of light should be substantially coherent light and/or have characteristic wavelength (preferably narrowband peak). In case of using broadband light source to generate a beam of light it is preferred to have a narrow band filter in front of the light source to produce narrow band well defined wavelength of light beam. The LiDAR device also comprises at least one receiver configured to detect the beam of light (such as laser) for sensing purposes. The LiDAR device uses the emitter and the receiver to cover a given field of view where the emitter generates a single pulse or a multi-pulse light beam (such as a laser beam) that is sampled by the receiver. In some examples, the LiDAR device may be a non-scanning, solid-state device having multiple sets of emitters and receivers that may be arranged in any suitable manner. Each set of emitter and receiver is a single pair that can be optically configured such that the emitter provide on-coincident axis laser beam to the corresponding receiver. In an embodiment, the LiDAR device is a high-frequency LiDAR device operating a frequency close to 10 kHz.

Optionally, the LiDAR device is a multi-spectral LiDAR device. Herein afterwards, sometimes the "LiDAR device" has been interchangeably referred to as "multi-spectral LiDAR device." When utilizing several active channels at different wavelengths and receiving intensity with multiple wavelengths, then the LiDAR device may be called as multispectral LiDAR device. Multispectral LiDAR device, herein, is understood as a device consisting of point clouds or other measurements coming from the LiDAR with at least two different wavelengths. In some examples, the multispectral LiDAR device may utilize three or more wavelengths depending on the application. The multispectral LiDAR device is used to control the at least one emitter and the at least one receiver to the same wavelengths for both emitting and detecting light in the configured wavelength. The realization of use of the multispectral LiDAR device in autonomous driving can be implemented by several ways, for example, but not limited to, linear-mode multispectral LiDAR, single-photon multispectral LiDAR, single-photon LiDAR with at least one wavelength, and at least one linear-mode LiDAR with another wavelength(s).

Optionally, the at least one emitter may be positioned in a different spatial location than the at least one receiver in a so called multi-static arrangement forming a multi-static multispectral LiDAR device. Further, the at least one emitter of the multispectral LiDAR may be mobile. Further, at the least one receiver of the multispectral LiDAR may be mobile. An example of a multi-static arrangement includes, without limitation, a multispectral LiDAR with the emitter positioned in the middle on top of roof of the vehicle and the receiver positioned in front and rear bumpers of the vehicle.

Optionally, the at least one receiver, in the LiDAR device, may comprise receivers which are sensitive to a band of wavelengths. Examples of such receivers include: active-pixel sensor (APS), passive-pixel sensors, back-illuminated receiver, photodiodes, 3T pixels and cells, 4T pixels and cells, 5T pixels, 6T pixels, thin-film transistors (TFT), pixels sensitive to different wavelengths, Bayer filter sensors, colour filter arrays, layered pixel receivers. For example, the at least one receiver may comprise of pixels which each are sensitive to red, green, and blue, ultraviolet, near infrared, or to wavelengths between 300 nm to 2000 nm.

Optionally, the LiDAR device may further comprise of at least one suitable optical filter which is positioned over the at least one receiver to capture or pass photons of at least one desired bandwidth. In some examples, the light received by at least one receiver is filtered by at least one dynamically configurable passband filter. The filter can be implemented in various arrangements, including Bragg mirrors, distributed Bragg reflector, dielectric mirror, or other similar means. The mirror or lens arrangements may include at least two optical elements, for example, but not limited to, dielectric layers, which are controlled by an actuation mechanism by varying their distance or relative position. Varying the position of the layers can be implemented for example, but not limited to, using piezoelectric mechanism, piezo actuated mechanism or MEMS based mechanisms. For example, without limitation, these mechanisms allow control of the median wavelength with a few nanometers of resolutions with pass band having a normally distributed shape with 3-20 nm standard deviation. Typical optical aperture size can be, for example, without limitation, 2 mm to 20 mm. This arrangement can be programmed to vary very rapidly for example, without limitation, 200-1000 Hz. This capability allows for one receiver or receivers to be used to scan multiple wavelengths of light at very rapid speed.

Optionally, the at least one receiver may also include optics which focus light on a light-sensitive imaging sensor thereof. In some examples, the at least one receiver may also include optics which refract, retract, disperse, scatter, or absorb light. Examples of such optics include lenses, prisms, dichroic prisms, polarizing filters, objects causing interference such as apertures and slits. Specifically, the optics may be used to filter or break light up into constituents based on polarization, wavelength and phase, and target the light to desired areas in the multispectral receiver based on these constituents or filter or pass specific constituents.

Optionally, the sensitivity of the receivers, in the LiDAR device, used for different constituents of light may be different. Specifically, the quantum efficiency of different receivers in the multispectral receiver may be different. Examples may include breaking the light into constituents and providing different constituents to receivers each with different sensitivity or providing same constituent to multiplicity of receivers with different sensitivity. In some examples, dividing light constituents into receivers with distinctive characteristics can be used to increase the dynamic range of the multispectral receiver.

Furthermore, as in known LiDAR systems, the lasers sources could be directed through the same optical system as the receiver, using beam splitters and optical layouts well within the capability of the skilled person familiar with LiDAR design. Many implementations may be possible, including to use one or more tuneable lasers in place of two or more separate lasers. In an embodiment the delays between the laser pulse trigger signal and emission of the pulse itself are calibrated for compensation. This delay can be different for different wavelengths, power settings, driver properties and operating temperatures, for example in the case of an optical parametric oscillator-based tuneable laser. It may be compensated, or the actual pulse output may be measured instead as a timing reference. Time delays such as this can be equated to height errors in the resulting profile and compensated downstream if preferred. Further, the shapes of the leading edge and the falling edge of the emitted laser pulse may vary according to wavelengths, power settings, driver properties and operating temperatures, and can be similarly calibrated for compensation.

Optionally, the LiDAR device may implement any one of several alternatives for providing spatial measurement mechanism depending on the application and platform. In one example, the LiDAR device may be used as a range camera without any scanning. This will enable rapid deployment without the added bulk of the motorized mirror and need of synchronization. Mirror-based scanning may be implemented with a polygonal, e.g. four-faceted mirror or conical Palmer scanning mirror. These are mechanically relatively simple and still offer good scanning speeds for linear or conical scanning patterns. Further, MEMS mirrors or phased array beam steering may be used to drive down the weight and size of the LiDAR device.

The LiDAR device comprises a controller operatively coupled to the at least one emitter and the at least one receiver. The controller may be a structure and/or module that comprise programmable and/or non-programmable components configured to store, process and/or share information. The controller may comprise any arrangement of physical or virtual computational entities capable of enhancing information to perform various computational tasks. The controller may comprise any arrangement of analog, digital or both analog and digital components. Optionally, the controller function may be embedded or integrated to other components. It should be appreciated that the controller may be both single hardware server and/or a plurality of hardware servers operating in a parallel or distributed architecture. In an example, the controller may comprise components such as memory, a processor, a network adapter and the like, to store, process and/or share information with other computing components, such as user device/user equipment. Optionally, the controller is implemented as Application-specific integrated circuit (ASIC) chip or Field-programmable gate array (FPGA) program. Optionally, the controller can be implemented as a computer program that provides various services (such as database service) to other devices, modules or apparatus.

The controller is configured to configure the at least one emitter and the at least one receiver to perform a first measurement, by emitting a first beam of light having a first wavelength, at a first instant of time; introduce a first passive period of time after the first measurement, perform a second measurement, by emitting a second beam of light having a second wavelength, at a second instant of time, wherein the second wavelength is different than the first wavelength and the second instant of time is after the first passive period of time; and introduce a second passive period of time after the second instant of time, wherein, the second passive period of time is different from the first passive period of time. In an embodiment, the passive periods of time, namely the first passive period of time and the second passive period of time, may be achieved by configuring the at least one emitter to transmit pulses of beam of lights at such timings that at least one of the reception time windows or reception gates do not have corresponding emitted pulses from the at least one emitter. For instance, every second reception time window may be without emitted laser pulses. It may be understood that although the LiDAR device has been described using two different passive periods of time (i.e., the first passive period of time and the second passive period of time) for laser emissions; however, the LiDAR device may be programmed to use more than two different passive periods of time for generating a sequence of laser emissions. Further, the length of passive periods may be random, stochastic, or follow a pattern, or be sampled from a distribution. I.e the controller is configured to perform the first measurement by emitting the beam of light at a first wavelength, and perform the second measurement by emitting the beam of light at a second wavelength, wherein the second wavelength is different than the first wavelength. Furthermore, the controller is configured to configure the at least one receiver to utilize beam of lights corresponding to pattern of the first wavelength for the first measurement and the second wavelength for the second measurement for the sensing purposes. For example, in some cases, the at least one emitter may need to emit beam of lights in two different wavelengths for object classification purposes or the like. The LiDAR device, being a multispectral LiDAR device, may emit the beam of light for the first measurement at the first wavelength, and emit the beam of light for the second measurement at the second wavelength. This way the at least one receiver, in the LiDAR device, may be able to better distinguish the beam of lights of the corresponding at least one emitter from the beam of lights of other LiDAR devices in the proximity, and thus reduce possibility of interference between the LiDAR devices.

In one exemplary configuration, the controller enables the at least one emitter and the at least one receiver to perform a first measurement and subsequently disable the at least one emitter for next $1/1000$ of second, and then re-enable the at least one emitter and the at least one receiver to perform a second measurement and again disable the at least one emitter for next $1/1000$ of second and repeating so forth. In another exemplary configuration, the controller enables the at least one emitter and the at least one receiver to perform a first measurement and subsequently disable the at least one emitter for next $1/1000$ of second, and then re-enable the at least one emitter and the at least one receiver to perform a second measurement and again disable the at least one emitter for next $1/1100$ of second and repeating so forth. In yet another exemplary configuration, the controller enables the at least one emitter and the at least one receiver to perform a first measurement and subsequently disable the at least one emitter for next $1/1000$ of second; then re-enable the at least one emitter and the at least one receiver to perform a second measurement and again disable the at least one emitter for next $1/1000$ of second; and then re-enable the at least one emitter and the at least one receiver to perform a third measurement and again disable the at least one emitter for next $1/900$ of second and repeating so forth. Thus, the controller can generate virtually infinite number of different sequences of the first instant of time, the first passive period of time, the second instant of time, the second passive period of time and so on for emission of beam of lights.

Optionally, the controller is configured to utilize beam of lights corresponding to sequence of the first passive period of time and the second passive period of time for the sensing purposes. That is, the at least one receiver is configured to process only those detected beam of lights which corresponds to the sequence of emissions and passive periods in between by the at least one emitter in the LiDAR device. As noted earlier, the LiDAR device may be programmed to use more than two different passive periods of time for generating a sequence of laser emissions. As may be contemplated by a person skilled in the art, larger the number of different passive periods of time being implemented between emissions, more unique would be the resultant sequence of emissions of the beam of lights, and thus lesser the probability of two LiDAR devices employing same sequence. And, by employing a unique sequence, the LiDAR device may be able to eliminate, or at least substantially reduce, potential interference from other LiDAR devices operating simultaneously in the proximity thereof.

Optionally, the LiDAR device further comprises a gating unit. The gating unit is operatively coupled to the at least one receiver to control detection of beam of lights therein. The gating unit is configured to limit a time gate (i.e., a time period) of detection of a photon in the at least one receiver from a time of sending of the photons by the at least one emitter to check for presence of the object within a certain distance range. That is, the detection of at least one photon within a time gate is used to estimate the distance of an object. The detection of a photon is timed and compared to the time when the corresponding pulse was sent, and the time between the sending the pulse and detecting a photon is used to estimate the distance to an object. Further, multiple detections of photons may be combined to form a more accurate estimate of the distance of the object. Furthermore, the gating unit is configured to vary the time gate of detection of the photon to check for presence of the object up to certain distances. For example, when measuring objects at a distance between 10 m and 20 m from the LiDAR device, a reception gate when at least one receiver is open, i.e. reacts to detected photons, is configured from 10 m/(299,700 km/s)*2=67 ns to 20 m/(299,700 km/s)*2=133 ns. It may be understood that the multiplier "2" above refers to the time from emitter to the target and back to the receiver and 299,700 km/s is the speed of light in air.

Furthermore, the gating unit may implement a gating strategy for setting the schedules of gating to achieve the desired characteristics of gating. The gating strategy is used to configure a desired distance resolution, range of measurement, count of photons needed. For instance, the gating strategy is constructed with equal steps for example for each one meter from the LiDAR device to 100 meters totaling 100 gates. The gate timing i.e. duration of each gate may be configured for example, but not limited to, closer gates have shorter time window, as the objects closer to the LiDAR device reflect more energy and photons than the object further away from the LiDAR device for which longer gate may be needed. The gate timings may be separate, joint, or overlapping. The gate timings may be dynamic for example, but not limited to, based on a sequence of configurations, based on external parameters for example a driving situation, based on a function for example a wave function, based on the objects recognized in the multispectral measurement data or some other sensor data.

Optionally, the first measurement and the second measurement include gate timings of the measurement device. For this purpose, the controller, in the LiDAR device, is configured to obtain gate timing information of the at least one emitter. Further, the controller is configured to add gate timings of the measurement device into time taken for completion of the first measurement and the second measurement, i.e. after the first instant of time and the second instant of time, respectively. This way the LiDAR device can still implement the gating strategy without confusion of the gate timings being considered as part of the passive periods of time, thus being able to implement the sequence required for operation thereof, in accordance with the present disclosure.

Optionally, the controller is configured to perform the first measurement by emitting the beam of light with a first polarization, and perform the second measurement by emitting the beam of light with a second polarization, wherein the second polarization is different than the first polarization. Furthermore, the controller is configured to configure the at least one receiver to utilize beam of lights corresponding to pattern of the first polarization for the first measurement and the second polarization for the second measurement for sensing purposes. This way the LiDAR device can makes use of polarimetry for reducing possibility of interference and further improving its performance. In the context of multispectral LiDAR, co-polarized refers to identical transmit and receive polarization states such as HH and VV. Cross polarization refers to transmitting in one polarization state, and receiving in the orthogonal polarization state. Cross polarized SAR channels are therefore HV and VH. Polarimetry can also add additional information extraction capability to the LiDAR device.

Optionally, the controller is configured to detect noise signals during one or more of the first passive period of time and the second passive period of time, and subtract the detected noise signals from the detected beam of lights during the first measurement and the second measurement. As may be understood that in a pitch-dark condition a lower laser emission power could be used as there are very few photon detections from the background radiation and the signal-to-noise ratio for detection of an object is good even with a very small number of detected photons; while in a direct sunlight condition there may be many photon detections from the background radiation and the signal-to-noise ratio for detection of an object gets poor if high power is not used in the LiDAR emission, and thus the power of the LiDAR device may need to be increased. The passive periods of time between the emissions provides an opportunity to determine the background conditions, or specifically the noise signals during that time. This information may later be used to calibrate the LiDAR device to subtract the detected noise signals from the detected beam of lights by the at least one receiver during the first measurement and the second measurement, which provides for improved operation of the LiDAR device.

Optionally, the controller is configured to detect noise signals during one or more of the first passive period of time and the second passive period of time, record a count of photons in the detected noise signals, determine intensity of the noise signals based on the count of photons, and adjust intensities of the beam of lights emitted during the first measurement and the second measurement based on the intensity of the noise signals. In particular, the controller is configured to adjust intensities of the beam of lights emitted during the first measurement and the second measurement proportional to the intensity of the noise signals. As discussed earlier, the passive periods of time between the emissions provides an opportunity to determine the background conditions; and in this case, specifically the intensity of the noise signals. This information may later be used to adjust intensities of the beam of lights emitted during the first measurement and the second measurement proportional to the intensity of the noise signals, in order to overcome those noise signals. That is, if the intensity of the noise signals is determined to be high, then the at least one emitter may increase power to emit the beam of lights during the first measurement and the second measurement with relatively higher intensity than usual.

Optionally, the controller is configured to obtain an identifier number that is unique to the LiDAR device, and apply a randomizing algorithm to the identifier number to determine one or more of the first passive period of time and the second passive period of time. An example of randomizing algorithm is using HASH. As discussed earlier that in order to reduce possibility of interference, different LiDAR devices may have to emit beam of lights with different sequence of the first passive period of time and the second passive period of time. In order to generate a unique sequence for each LiDAR device, the controller may utilize an inherent characteristic or property of the LiDAR device. Since, generally, each LiDAR device have a unique identifier number, the controller may use that unique identifier number to generate a unique string. The controller may apply any known randomizing algorithm such as HASH function, where the HASH function may be a cryptographic hash function which takes the unique identifier number as an input and returns a fixed-size alphanumeric string. In turn, this unique string may be used to generate values for one or more of the first passive period of time and the second passive period of time. Such technique may be contemplated by a person skilled in the art, and thus has not been described in more detail for the brevity of the present disclosure.

Optionally, the controller is configured to obtain a location coordinate of the LiDAR device, and apply a randomizing algorithm to the location coordinate to determine one or more of the first passive period of time and the second passive period of time. Similar to the above example, here the controller, instead of using the identifier number, may use the location coordinate of the LiDAR device, or the location coordinate of the vehicle in which the LiDAR device is installed. Since, the location coordinate of each LiDAR device would be unique to each LiDAR device (e.g., using any one of the sophisticated location sensing means like GPS, GLONASS, GALILEO, BEIDOU, INSS, etc. which provides location approximation up to few feet), thus the controller may be able to apply randomizing algorithm such as HASH function to the location coordinate to generate a unique alphanumeric string which could, in turn, be used to generate values for one or more of the first passive period of time and the second passive period of time.

Optionally, the controller is configured to generate random or pseudo-random numbers to determine one or more of the first passive period of time and/or the second passive period of time. In case of a pseudo-random, the the pseudo-random number generators may be seeded with the exact time at the time of starting the generator. A seed number for such random or pseudo-random numbers can also obtained for example using location information.

Optionally, the controller is configured to use the passive periods of time between the laser emissions to detect attempts of spoofing or jamming of the LiDAR device. For example, a distribution of spectrum of different lighting conditions is recorded and the recorded spectrum is compared to the known distribution to determine the probability of at least one passive period of time (i.e. the passive frame when the LiDAR device is not emitting) consisting of background lighting. If a substantial deviation is found in the determined probability, then it may be concluded that the LiDAR device may have been compromised, and appropriate action may be taken. Furthermore, the internal consistency of at least one passive frame may be analysed and compared against the known distribution of properties for passive frames, where the properties may comprise contrast, PCA, FFT, discrete cosine, Radon, Hough, Neural Networks, Deep Learning and similar metrics or transformations to check for inconsistencies.

According to an alternative embodiment the present disclosure provides a method of operating a measurement device, the method comprising:

performing a first measurement, by emitting a first beam of light, at a first instant of time;

introducing a first passive period of time after the first measurement;

performing a second measurement, by emitting a second beam of light, at a second instant of time, wherein the second instant of time is after the first passive period of time; and introducing a second passive period of time after the second instant of time, wherein the second passive period of time is different from the first passive period of time.

The present disclosure also relates to the method as described above. Various embodiments and variants disclosed above apply mutatis mutandis to the method.

Optionally, the method comprises configuring the measurement device to utilize beam of lights corresponding to sequence of the first passive period of time and the second passive period of time for sensing purposes.

Optionally, the first measurement and the second measurement include gate timings of the measurement device.

Optionally, the method comprises performing the first measurement by emitting the beam of light with a first polarization, and performing the second measurement by emitting the beam of light with a second polarization, wherein the second polarization is different than the first polarization.

Optionally, the method comprises detecting noise signals during one or more of the first passive period of time and the second passive period of time, and subtracting the detected noise signals from detected beam of lights during the first measurement and the second measurement.

Optionally, the method comprises detecting noise signals during one or more of the first passive period of time and the second passive period of time, recording a count of photons in the detected noise signals, determining intensity of the noise signals based on the count of photons, and adjusting intensities of the beam of lights emitted during the first measurement and the second measurement based on the intensity of the noise signals.

Optionally, the adjustment in the intensities of the beam of lights emitted during the first measurement and the second measurement is proportional to the intensity of the noise signals.

Optionally, the adjustment in the intensities of the beam of lights emitted during the first measurement and the second measurement are dependent on the distance to the nearest object. For example, without limitation, the first of the beam of lights may be emitted at low power and in no object was found near the second of the beam of lights may be emitted at high power as there are no object that would be harmed of the high power beam in a close distance based on the first measurement. Optionally, the method comprises obtaining an identifier number that is unique to the measurement device, and applying a HASH algorithm to the identifier number to determine one or more of the first passive period of time and the second passive period of time for the corresponding measurement device.

Optionally, the method comprises obtaining a location coordinate of the measurement device, and applying a randomizer algorithm to the location coordinate to determine one or more of the first passive period of time and the second passive period of time for the corresponding measurement device.

Optionally, the method comprises of determining one or more of the first passive period of time and the second passive period of time randomly or quasi-randomly.

Optionally, the passive period of time is a period of time when no beam of light is emitted from the measurement device. Alternatively the passive period of time is a period of time when the measurement device is configured not to sense light. In general the passive period term in this disclosure refers to a period of time between two separate distance measurements. Typically beam of light is not emitted during the passive period for measurement purposes during the passive period, typically receiver is configured not to measure light beams during the passive period.

Optionally, the measurement device is a Light Detection And Ranging device (LiDAR) device. In other embodiments, the measurement device may be one of RAdio Detection And Ranging (RADAR) device, SOund Navigation And Ranging (SONAR), or the like.

According to an alternative embodiment of the present disclosure provides a measurement device comprising:

at least one emitter configured to generate beam of lights;

at least one receiver configured to detect the beam of lights for sensing purposes; and a controller operatively coupled to the at least one emitter and the at least one receiver and is configured to:

perform a first measurement, by emitting a first beam of light, at a first instant of time;

introduce a first passive period of time after the first measurement;

perform a second measurement, by emitting a second beam of light, at a second instant of time, wherein the second instant of time is after the first passive period of time; and introduce a second passive period of time after the second instant of time, wherein the second passive period of time is different from the first passive period of time.

In one embodiment the measurement device is mounted in a car.

DETAILED DESCRIPTION OF THE DRAWINGS

Referring to FIG. 1, illustrated is a schematic diagram of an exemplary situation having two measurement devices, namely a first measurement device 100 and a second measurement device 110, and an object 10. The measurement devices can be mounted for example in a front of a first car and a second car respectively (not shown in figure). The measurement devices 100 and 110 provide for reduced interference, in accordance with an embodiment of the present disclosure. As shown, the first measurement device 100 comprises at least one emitter 102 configured to generate beam of lights. The first measurement device 100 also comprises at least one receiver 104 configured to detect the beam of lights for sensing purposes. Further, the first measurement device 100 comprises a controller 106 operatively coupled to the at least one emitter 102 and the at least one receiver 104. The controller 106 is configured to utilize a beam of light, such as a laser beam S1, for measurement of distance thereof from objects, such as the object 10. Further, as shown, the second measurement device 110 comprises at least one emitter 112 configured to generate beam of lights. The second measurement device 110 also comprises at least one receiver 114 configured to detect the beam of lights for sensing purposes. Further, the second measurement device 110 comprises a controller 116 operatively coupled to the at least one emitter 112 and the at least one receiver 114. The controller 116 is configured to utilize a beam of light, such as a laser beam S2, for measurement of distance thereof from objects, such as the object 10.

Figure 2:
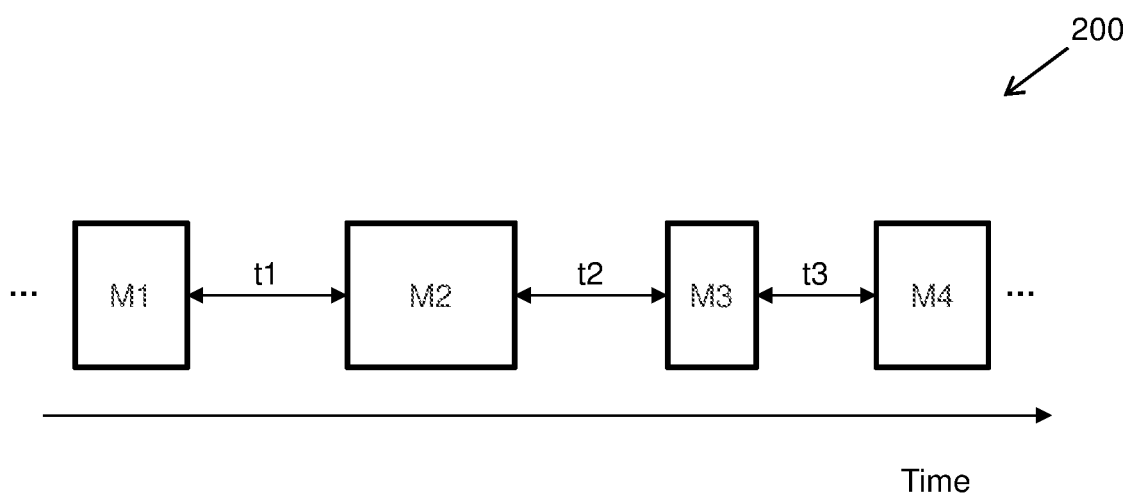
FIG. 2 is a schematic illustration of sequence of timings in operation of a measurement device, in accordance with an embodiment of the present disclosure.

FIG. 2 illustrates a schematic of sequence of timings 200 in operation of a measurement device. In the illustration, the measurement device is shown to perform four measurements, namely a first measurement M1, a second measurement M2, a third measurement M3 and a fourth measurement M4. The time for completion of each of the measurements M1, M2, M3 and M4 may vary due to different gate timings implemented for each measurement. Further, the controller 106 introduces passive periods of time, namely a first passive period of time t1 after the first measurement M1, a second passive period of time t2 after the second measurement M2, a third passive period of time t3 after the third measurement M3, and so on. During each of the passive periods of time t1, t2 and t3, no beam of light is emitted (i.e. the measurement device is in passive mode from distance measurement point of view). Further, the first passive period of time t1, the second passive period of time t2 and the third passive period of time t3 may be different from each other. This generates a unique sequence of timings of measurements and passive periods of time in between for each beam of light from the measurement device, and the controller of the measurement device is also configured to configure the at least one receiver to utilize beam of lights corresponding to sequence of timings for the sensing purposes, which is used to avoid interference from other measurement devices in the vicinity.

Referring back to FIG. 1, it may be seen that the emitter 102, in the measurement device 100, emits the laser beam (beam of light) S1 and the emitter 112, in the measurement device 110, emits the laser beam (beam of light) S2.

In an example a distance between the measurement device 100 and 110 is 50 meters and distance between the measurement device 100 and the object 10 is 25 meters. In the example duration of a beam of light pulse is 10 nsec (nano seconds). If the beam of light S2 was emitted (first measurement with measurement device 110) at time t0 it would arrive to receiver 104 of the measurement device 100 at time of t=d/c (wherein d is distance and c is speed of light) i.e. 50 m/3×10^8m/s=167 nsec after t0. Since the duration of the pulse of light is 10 nsec the light can be sensed between time of 167 nsec to 177 nsec with the receiver 104. If the beam of light S1 was emitted (first measurement with measurement device 100) at the same time t0 the reflection back from the object 10 would arrive to the receiver 104 at the same time as beam of light S2 (167 ns after t0). This would lead to interference of measurement. According to the setup of the disclosure the measurement device 110 and/or the measurement device 100 introduces a first passive time before making a second measurement. In present example we assume that the measurement device 100 has a first passive period of time of 1000 nsec and the measurement device 110 has a first passive period of time of 1300 nsec. Second measurement with the measurement device 110 would take place at time t1 (1000 nsec after the first measurement). A second beam of light S2 of the second measurement would arrive to receiver 104 at time t1+167 nsec. Since the measurement device 100 is still in the passive period of time there will be no interference. The measurement device 100 would start the second measurement at time t1+300 nsec i.e would be free from interference from beam of light S2.

In the illustrated situation, the controller 106 in the measurement device 100 configures the receiver 104 to only utilize the laser beam S1 for sensing purposes. Therefore, even if the measurement device 100 may receive the laser beam S2, since the sequence timings for the two laser beams S1 and S2 are different, the measurement device 100 can thus ignore the laser beam S2 to only provide sensing based on the corresponding emitted laser beam S1 only, as and when received. This way the measurement device 100 and 110 avoid interference with each other.

Figure 3:
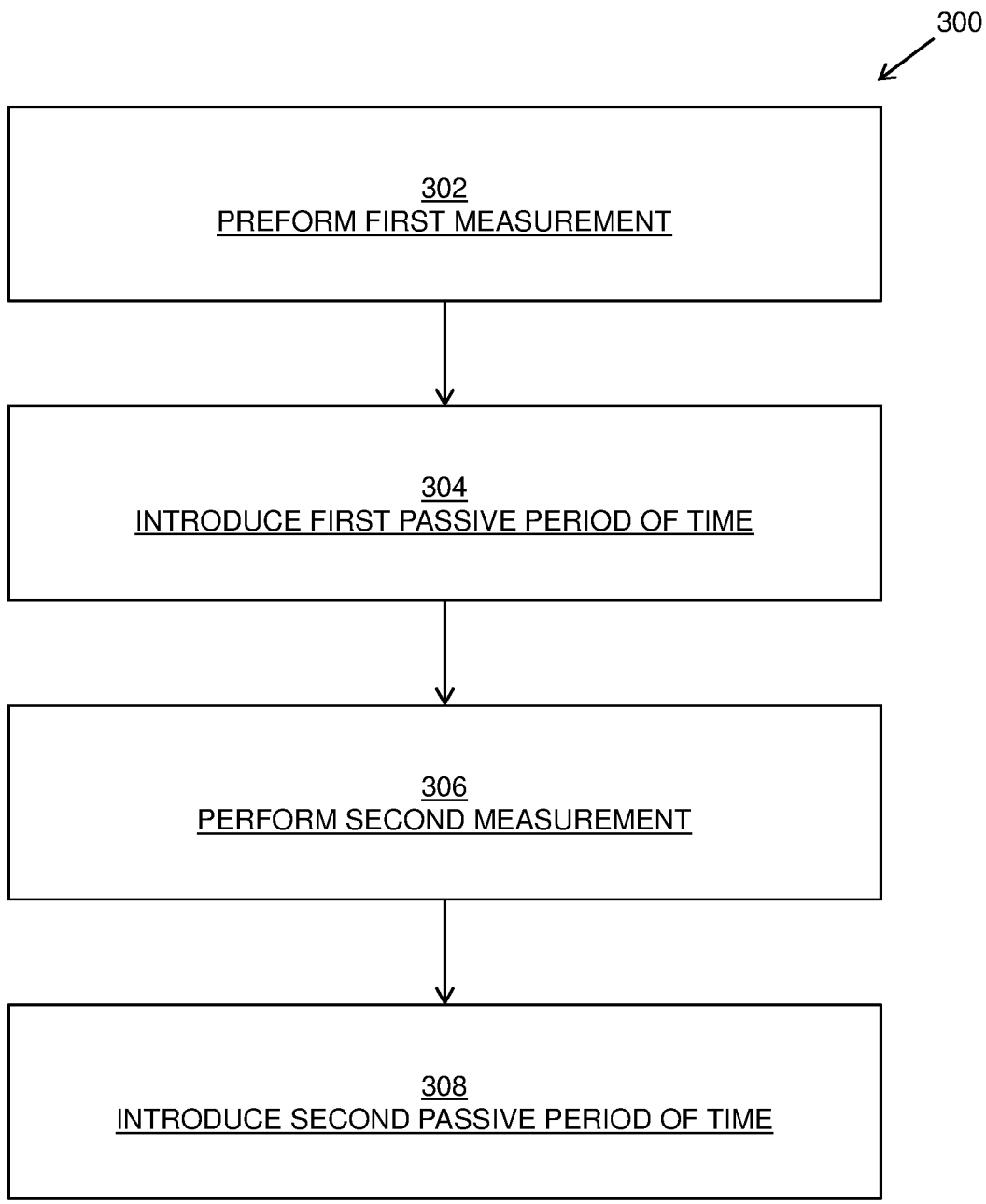
FIG. 3 is an illustration of steps of a method of operating a measurement device, in accordance with an embodiment of the present disclosure.

Referring to FIG. 3, there is shown an illustration of steps of method 300 of operating a measurement device, in accordance with an embodiment of the present disclosure. At a step 302, a first measurement is performed, by emitting a beam of light, at a first instant of time. At a step 304, a first passive period of time is introduced after the first measurement, wherein, during the first passive period of time, no beam of light is emitted. At step 306, a second measurement is performed, by emitting a beam of light, at a second instant of time, wherein the second instant of time is after the first passive period of time. At step 308, a second passive period of time is introduced after the second instant of time, wherein, during the second passive period of time, no beam of light is emitted and the second passive period of time is different from the first passive period of time.

The steps 302 to 308 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method of operating a measurement device, the method comprising:
   performing a first measurement, by emitting a first beam of light having a first wavelength, at a first instant of time;
   introducing a first passive period of time after the first measurement;
   performing a second measurement, by emitting a second beam of light having a second wavelength, at a second instant of time, wherein the second wavelength is different than the first wavelength and the second instant of time is after the first passive period of time; and
   introducing a second passive period of time after the second instant of time, wherein the second passive period of time is different from the first passive period of time;
   detecting noise signals during one or more of the first passive period of time and the second passive period of time;
   recording a count of photons in the detected noise signals;
   determining an intensity of the noise signals based on the count of photons; and adjusting intensities of the beam of lights emitted during the first measurement and the second measurement based on the intensity of the noise signals.

2. The method according to claim 1, further comprising configuring the measurement device to utilize beam of lights corresponding to a sequence of the first passive period of time and the second passive period of time for sensing purposes.

3. The method according to claim 1, wherein the first measurement and the second measurement include gate timings of the measurement device.

4. The method according to claim 1, further comprising:
performing the first measurement by emitting the first beam of light with a first polarization; and
performing the second measurement by emitting the second beam of light with a second polarization, wherein the second polarization is different than the first polarization.

5. The method according to claim 1, further comprising:
detecting noise signals during one or more of the first passive period of time and the second passive period of time; and
subtracting the detected noise signals from detected beam of lights during the first measurement and the second measurement.

6. The method according to claim 1, wherein the adjustment in the intensities of the beam of lights emitted during the first measurement and the second measurement is proportional to the intensity of the noise signals.

7. The method according to claim 1, further comprising:
obtaining an identifier number that is unique to the measurement device; and
applying a randomizing algorithm to the identifier number to determine one or more of the first passive period of time and the second passive period of time for the corresponding measurement device.

8. The method according to claim 1, further comprising:
obtaining a location coordinate of the measurement device; and
applying a randomizing algorithm to the location coordinate to determine one or more of the first passive period of time and the second passive period of time for the corresponding measurement device.

9. The method according to claim 1, wherein one or more of the first passive period of time and/or the second passive period time is determined using random generators.

10. The method according to claim 1 wherein during the passive period of times no beam of light is emitted.

11. A measurement device comprising:
at least one emitter configured to generate beam of lights;
at least one receiver configured to detect the beam of lights for sensing purposes; and
a controller operatively coupled to the at least one emitter and the at least one receiver, the controller being configured to:
perform a first measurement, by emitting a first beam of light having a first wavelength, at a first instant of time;
introduce a first passive period of time after the first measurement;
perform a second measurement, by emitting a second beam of light of a second wavelength, at a second instant of time, wherein the second wavelength is different than the first wavelength and the second instant of time is after the first passive period of time;
introduce a second passive period of time after the second instant of time, wherein the second passive period of time is different from the first passive period of time;
detect noise signals during one or more of the first passive period of time and the second passive period of time;
record a count of photons in the detected noise signals;
determine an intensity of the noise signals based on the count of photons; and
adjust intensities of the beam of lights emitted during the first measurement and the second measurement based on the intensity of the noise signals.

12. The measurement device according to claim 11, wherein the controller is configured to utilize beam of lights corresponding to sequence of the first passive period of time and the second passive period of time for sensing purposes.

13. The measurement device according to claim 11, wherein the first measurement and the second measurement include gate timings of the measurement device.

14. The measurement device according to claim 11, wherein the controller is configured to:
perform the first measurement by emitting the first beam of light with a first polarization; and
perform the second measurement by emitting the second beam of light with a second polarization, wherein the second polarization is different than the first polarization.

15. The measurement device according to claim 11, wherein the controller is configured to:
detect noise signals during one or more of the first passive period of time and the second passive period of time; and
subtract the detected noise signals from the detected beam of lights during the first measurement and the second measurement.

16. The measurement device according to claim 11, wherein the controller is configured to:
obtain an identifier number that is unique to the measurement device; and
apply a randomizing algorithm to the identifier number to determine one or more of the first passive period of time and the second passive period of time for the corresponding measurement device.

17. The measurement device according to claim 11, wherein the controller is configured to:
obtain a location coordinate of the measurement device; and
apply a randomizing algorithm to the location coordinate to determine one or more of the first passive period of time and the second passive period of time for the corresponding measurement device.

18. The measurement device according to claim 11, wherein the measurement device is implemented as a Light Detection and Ranging device.

19. The measurement device according to claim 11 wherein during the passive period of times no beam of light is emitted.

* * * * *